(12) United States Patent
Venugopal et al.

(10) Patent No.: US 11,445,447 B2
(45) Date of Patent: Sep. 13, 2022

(54) TECHNIQUES FOR ACTIVATING A PATHLOSS REFERENCE SIGNAL

(71) Applicant: QUALCOMM Incorporated, San Diego, CA (US)

(72) Inventors: Kiran Venugopal, Raritan, NJ (US); Yan Zhou, San Diego, CA (US); Tao Luo, San Diego, CA (US); Tianyang Bai, Somerville, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/949,031

(22) Filed: Oct. 9, 2020

(65) Prior Publication Data
US 2021/0195530 A1 Jun. 24, 2021

Related U.S. Application Data

(60) Provisional application No. 62/949,829, filed on Dec. 18, 2019.

(51) Int. Cl.
| | |
|---|---|
| *H04W 52/14* | (2009.01) |
| *H04L 5/00* | (2006.01) |
| *H04W 52/24* | (2009.01) |

(52) U.S. Cl.
CPC ......... *H04W 52/146* (2013.01); *H04L 5/0048* (2013.01); *H04W 52/242* (2013.01)

(58) Field of Classification Search
CPC . H04W 52/242; H04W 52/146; H04W 52/18; H04L 5/003; H04L 5/0048
USPC ..................... 455/522, 69, 452.1, 509, 67.11
See application file for complete search history.

(56) References Cited

U.S. PATENT DOCUMENTS

| | | | |
|---|---|---|---|
| 2019/0141742 A1 | 5/2019 | Zhou et al. | |
| 2019/0190582 A1* | 6/2019 | Guo | ...................... H04B 7/0695 |
| 2019/0215781 A1 | 7/2019 | Jeon et al. | |
| 2019/0261280 A1* | 8/2019 | Jung | ................... H04W 52/146 |
| 2019/0349864 A1* | 11/2019 | Zhang | ................... H04W 52/42 |

(Continued)

OTHER PUBLICATIONS

3GPP: "3rd Generation Partnership Project; Technical Specification Group Radio Access Network; NR; Radio Resource Control (RRC) Protocol Specification (Release 15)", 3GPP Draft; 38.331, V15.5.1, 3rd Generation Partnership Project (3GPP), Mobile Competence Centre; 650, Route Des Lucioles; F-06921 Sophia-Antipolis Cedex; France, Apr. 16, 2019 (Apr. 16, 2019), XP051698589, 491 pages, Retrieved from the Internet: URL: http://www.3gpp.org/ftp/3guInternal/ 3GPP%5Fultimate%5Fversions%5Fto%5Fbe%5Ftransposed/ sentToDpc/38331%2Df51%2Ezip [retrieved on Apr. 16, 2019] p. 282.

(Continued)

*Primary Examiner* — John J Lee
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive an indication of an uplink transmission configuration indication (TCI) state. The UE may determine that the uplink TCI state identifies a pathloss reference signal for an associated uplink transmission. The UE may determine an uplink power control parameter for the uplink transmission based at least in part on the pathloss reference signal. Numerous other aspects are provided.

28 Claims, 8 Drawing Sheets

(56) References Cited

U.S. PATENT DOCUMENTS

| | | | |
|---|---|---|---|
| 2019/0349867 A1* | 11/2019 | MolavianJazi | H04W 52/242 |
| 2021/0051668 A1* | 2/2021 | Yu | H04W 72/046 |
| 2021/0051710 A1* | 2/2021 | Cirik | H04W 74/0833 |
| 2021/0105765 A1* | 4/2021 | Cirik | H04B 7/0695 |

OTHER PUBLICATIONS

3GPP TS 38.306: "5G; NR; User Equipment (UE) Radio Access Capabilities (3GPP TS 38.306 Version 15.7.0 Release 15)", ETSI Technical Specification, European Telecommunications Standards Institute (ETSI), 650, Route Des Lucioles; F-06921 Sophia-Antipolis; France, vol. 3GPP RAN, No. V15.7.0, Oct. 15, 2019 (Oct. 15, 2019), pp. 1-57, XP014356036, Retrieved from the Internet: URL: http://www.etsi.org/deliver/etsi_ts/138300_138399/138306/15.07.00_60/ts_138306v150700p.pdf [retrieved on Oct. 15, 2019] 4.2, 4.2.7.2.

3GPP TS 38.321: "3rd Generation Partnership Project; Technical Specification Group Radio Access Network; NR; Medium Access Control (MAC) Protocol Specification (Release 15)", 3GPP Draft; V15.5.0 (Mar. 2019), 38321-F50, 3rd Generation Partnership Project (3GPP), Mobile Competence Centre; 650, Route Des Lucioles; F-06921 Sophia-Antipolis Cedex; France, Apr. 9, 2019 (Apr. 9, 2019), pp. 1-78, XP051698585, Retrieved from the Internet: URL: http://www.3gpp.org/ftp/3guInternal/3GPP%5Fultimate%5Fversions%5Fto%5Fbe%5Ftransposed/sentToDpc/38321%2Df50%2Ezip [retrieved on Apr. 9, 2019] 5.6, 6.1.3.17.

"5G; NR; Physical Layer Procedures for Control (3GPP TS 38.213, version 15.7.0 Release 15)", ETSI Technical Specification, European Telecommunications Standards Institute (ETSI), 650, Route Des Lucioles, F-06921 Sophia-Antipolis Cedex, France, vol. 3GPP RAN. No. V15.7.0, Oct. 15, 2019 (Oct. 15, 2019), pp. 1-112. XP014356032, Retrieved from the Internet: URL: http://www.etsi.org/deliver/etsi_ts/138200_138299/138213/15.07.00_60/ts_13S213v150700p.pdf. [retrieved on Oct. 15, 2019] 7.

International Search Report and Written Opinion—PCT/US2020/070800—ISA/EPO—dated Feb. 16, 2021.

* cited by examiner

TECHNIQUES FOR ACTIVATING A PATHLOSS REFERENCE SIGNAL

CROSS-REFERENCE TO RELATED APPLICATION

This patent application claims priority to U.S. Provisional Patent Application No. 62/949,829, filed on Dec. 18, 2019, entitled "TECHNIQUES FOR ACTIVATING A PATHLOSS REFERENCE SIGNAL," and assigned to the assignee hereof. The disclosure of the prior application is considered part of and is incorporated by reference into this patent application.

FIELD OF THE DISCLOSURE

Aspects of the present disclosure generally relate to wireless communication and more particularly to techniques for activating a pathloss reference signal.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication of an uplink transmission configuration indication (TCI) state; determining that the uplink TCI state identifies a pathloss reference signal for an associated uplink transmission; and determining an uplink power control parameter for the uplink transmission based at least in part on the pathloss reference signal.

In some aspects, the method includes performing the uplink transmission using the uplink power control parameter. In some aspects, the method includes performing the uplink transmission in a physical uplink control channel resource, a physical uplink shared channel resource, a physical random access channel resource, or a sounding reference signal resource or resource set. In some aspects, receiving the indication of the uplink TCI state comprises receiving the indication of the uplink TCI state in a radio resource control communication, a medium access control control element communication, or a downlink control information communication.

In some aspects, determining that the uplink TCI state identifies the pathloss reference signal comprises identifying, in a downlink communication in which the indication of the uplink TCI state is included, a field configured to indicate whether the uplink TCI state identifies the pathloss reference signal, and determining that the uplink TCI state identifies the pathloss reference signal based at least in part on the field. In some aspects, the method includes receiving an indication that the uplink TCI state identifies an updated pathloss reference signal that is different from the pathloss reference signal, wherein the indication that the uplink TCI state identifies the updated pathloss reference signal is received in a different downlink communication from a downlink communication in which the indication of the uplink TCI state is received.

In some aspects, the method includes determining that that the uplink TCI state does not identify the pathloss reference signal; and identifying the pathloss reference signal based at least in part on at least one of a radio resource control communication, a medium access control element communication, or a downlink control information communication. In some aspects, determining that the uplink TCI state identifies the pathloss reference signal comprises determining that the uplink TCI state identifies the pathloss reference signal based at least in part on the uplink transmission being scheduled.

In some aspects, a method of wireless communication, performed by a base station (BS), may include transmitting, to a UE, an indication of an uplink TCI state; and transmitting an associated pathloss reference signal based at least in part on the uplink TCI state.

In some aspects, the method includes receiving an uplink transmission, that is based at least in part on the pathloss reference signal, in a physical uplink control channel resource, a physical uplink shared channel resource, a physical random access channel resource, or a sounding reference signal resource or resource set. In some aspects, transmitting the indication of the uplink TCI state comprises transmitting the indication of the uplink TCI state in a radio resource control communication, a medium access control control element communication, or a downlink control information communication. In some aspects, transmitting the indication of the uplink TCI state comprises transmitting the indication of the uplink TCI state in a downlink communication, wherein the downlink communication includes a field configured to indicate whether the uplink TCI state identifies the pathloss reference signal.

In some aspects, transmitting the indication of the uplink TCI state comprises determining to update the pathloss reference signal for an associated uplink transmission, and transmitting the indication of the uplink TCI state based at least in part on the determination. In some aspects, the method includes determining to update the pathloss reference signal for an associated uplink transmission, and transmitting, based at least in part on the determination, an indication of an updated pathloss reference signal in a different downlink communication from a downlink communication in which the indication of the uplink TCI state is transmitted.

In some aspects, the method includes transmitting an indication of the pathloss reference signal in at least one of a radio resource control communication, a medium access control element communication, or a downlink control information communication, wherein the uplink TCI state does not identify the pathloss reference signal. In some aspects, the pathloss reference signal based at least in part on the uplink transmission.

In some aspects, a UE for wireless communication may include memory and one or more processors operatively coupled to the memory. The memory and the one or more processors may be configured to receive an indication of an uplink TCI state; determine that the uplink TCI state identifies a pathloss reference signal for an associated uplink transmission; and determine an uplink power control parameter for the uplink transmission based at least in part on the pathloss reference signal.

In some aspects, the one or more processors are further configured to perform the uplink transmission using the uplink power control parameter. In some aspects, the one or more processors are further configured to perform the uplink transmission in a physical uplink control channel resource, a physical uplink shared channel resource, a physical random access channel resource, or a sounding reference signal resource or resource set. In some aspects, the one or more processors, when receiving the indication of the uplink TCI state, are to receive the indication of the uplink TCI state in a radio resource control communication, a medium access control control element communication, or a downlink control information communication.

In some aspects, the one or more processors, when determining that the uplink TCI state identifies the pathloss reference signal, are to identify, in a downlink communication in which the indication of the uplink TCI state is included, a field configured to indicate whether the uplink TCI state identifies the pathloss reference signal; and determine that the uplink TCI state identifies the pathloss reference signal based at least in part on the field. In some aspects, the one or more processors are further configured to receive an indication that the uplink TCI state identifies an updated pathloss reference signal that is different from the pathloss reference signal, wherein the indication that the uplink TCI state identifies the updated pathloss reference signal is received in a different downlink communication from a downlink communication in which the indication of the uplink TCI state is received.

In some aspects, the one or more processors are further configured to determine that that the uplink TCI state does not identify the pathloss reference signal; and identify the pathloss reference signal based at least in part on at least one of a radio resource control communication, a medium access control element communication, or a downlink control information communication. In some aspects, the one or more processors, when determining that the uplink TCI state identifies the pathloss reference signal, are to determine that the uplink TCI state identifies the pathloss reference signal based at least in part on the uplink transmission being scheduled.

In some aspects, a BS for wireless communication may include memory and one or more processors operatively coupled to the memory. The memory and the one or more processors may be configured to transmit, to a UE, an indication of an uplink TCI state, and transmit an associated pathloss reference signal based at least in part on the uplink TCI state.

In some aspects, the one or more processors are further configured to receive an uplink transmission, that is based at least in part on the pathloss reference signal, in a physical uplink control channel resource, a physical uplink shared channel resource, a physical random access channel resource, or a sounding reference signal resource or resource set. In some aspects, the one or more processors, when transmitting the indication of the uplink TCI state, are to transmit the indication of the uplink TCI state in a radio resource control communication, a medium access control control element communication, or a downlink control information communication. In some aspects, the one or more processors, when transmitting the indication of the uplink TCI state, are to transmit the indication of the uplink TCI state in a downlink communication, wherein the downlink communication includes a field configured to indicate whether the uplink TCI state identifies the pathloss reference signal.

In some aspects, the one or more processors, when transmitting the indication of the uplink TCI state, are to determine to update the pathloss reference signal for an associated uplink transmission, and transmit the indication of the uplink TCI state based at least in part on the determination. In some aspects, the one or more processors are further configured to determine to update the pathloss reference signal for an associated uplink transmission; and transmit, based at least in part on the determination, an indication of an updated pathloss reference signal in a different downlink communication from a downlink communication in which the indication of the uplink TCI state is transmitted.

In some aspects, the one or more processors are further configured to transmit an indication of the pathloss reference signal in at least one of a radio resource control communication, a medium access control element communication, or a downlink control information communication, wherein the uplink TCI state does not identify the pathloss reference signal. In some aspects, the pathloss reference signal based at least in part on the uplink transmission.

In some aspects, a non-transitory computer-readable medium may store one or more instructions for wireless communication. The one or more instructions, when executed by one or more processors of a UE, may cause the one or more processors to receive an indication of an uplink TCI state; determine that the uplink TCI state identifies a pathloss reference signal for an associated uplink transmission; and determine an uplink power control parameter for the uplink transmission based at least in part on the pathloss reference signal.

In some aspects, the one or more instructions, when executed by the one or more processors, further cause the one or more processors to perform the uplink transmission using the uplink power control parameter. In some aspects, the one or more instructions, when executed by the one or more processors, further cause the one or more processors to perform the uplink transmission in a physical uplink control channel resource, a physical uplink shared channel resource, a physical random access channel resource, or a sounding reference signal resource or resource set. In some aspects, the one or more instructions, that cause the one or more processors to receive the indication of the uplink TCI state, cause the one or more processors to receive the indication of the uplink TCI state in a radio resource control communication, a medium access control control element communication, or a downlink control information communication.

In some aspects, the one or more instructions, that cause the one or more processors to determine that the uplink TCI state identifies the pathloss reference signal, cause the one or more processors to identify, in a downlink communication in which the indication of the uplink TCI state is included, a field configured to indicate whether the uplink TCI state identifies the pathloss reference signal; and determine that the uplink TCI state identifies the pathloss reference signal based at least in part on the field. In some aspects, the one or more instructions, when executed by the one or more processors, further cause the one or more processors to receive an indication that the uplink TCI state identifies an updated pathloss reference signal that is different from the pathloss reference signal, wherein the indication that the uplink TCI state identifies the updated pathloss reference signal is received in a different downlink communication from a downlink communication in which the indication of the uplink TCI state is received.

In some aspects, the one or more instructions, when executed by the one or more processors, further cause the one or more processors to determine that that the uplink TCI state does not identify the pathloss reference signal; and identify the pathloss reference signal based at least in part on at least one of a radio resource control communication, a medium access control element communication, or a downlink control information communication. In some aspects, the one or more instructions, that cause the one or more processors to determine that the uplink TCI state identifies the pathloss reference signal, cause the one or more processors to determine that the uplink TCI state identifies the pathloss reference signal based at least in part on the uplink transmission being scheduled.

In some aspects, a non-transitory computer-readable medium may store one or more instructions for wireless communication. The one or more instructions, when executed by one or more processors of a BS, may cause the one or more processors to transmit, to a UE, an indication of an uplink TCI state; and transmit an associated pathloss reference signal based at least in part on the uplink TCI state.

In some aspects, the one or more instructions, when executed by the one or more processors, further cause the one or more processors to receive an uplink transmission, that is based at least in part on the pathloss reference signal, in a physical uplink control channel resource, a physical uplink shared channel resource, a physical random access channel resource, or a sounding reference signal resource or resource set. In some aspects, the one or more instructions, that cause the one or more processors to transmit the indication of the uplink TCI state, cause the one or more processors to transmit the indication of the uplink TCI state in a radio resource control communication, a medium access control control element communication, or a downlink control information communication. In some aspects, the one or more instructions, that cause the one or more processors to transmit the indication of the uplink TCI state, cause the one or more processors to transmit the indication of the uplink TCI state in a downlink communication, wherein the downlink communication includes a field configured to indicate whether the uplink TCI state identifies the pathloss reference signal.

In some aspects, the one or more instructions, that cause the one or more processors to transmit the indication of the uplink TCI state, cause the one or more processors to determine to update the pathloss reference signal for an associated uplink transmission; and transmit the indication of the uplink TCI state based at least in part on the determination. In some aspects, the one or more instructions, when executed by the one or more processors, further cause the one or more processors to determine to update the pathloss reference signal for an associated uplink transmission; and transmit, based at least in part on the determination, an indication of an updated pathloss reference signal in a different downlink communication from a downlink communication in which the indication of the uplink TCI state is transmitted.

In some aspects, the one or more instructions, when executed by the one or more processors, further cause the one or more processors to transmit an indication of the pathloss reference signal in at least one of a radio resource control communication, a medium access control element communication, or a downlink control information communication, wherein the uplink TCI state does not identify the pathloss reference signal. In some aspects, the pathloss reference signal based at least in part on the uplink transmission.

In some aspects, an apparatus for wireless communication may include means for receiving an indication of an uplink TCI state; means for determining that the uplink TCI state identifies a pathloss reference signal for an associated uplink transmission; and means for determining an uplink power control parameter for the uplink transmission based at least in part on the pathloss reference signal.

In some aspects, the apparatus further comprises means for performing the uplink transmission using the uplink power control parameter. In some aspects, the apparatus further comprises means for performing the uplink transmission in a physical uplink control channel resource, a physical uplink shared channel resource, a physical random access channel resource, or a sounding reference signal resource or resource set. In some aspects, the means for receiving the indication of the uplink TCI state comprises means for receiving the indication of the uplink TCI state in a radio resource control communication, a medium access control control element communication, or a downlink control information communication.

In some aspects, the means for determining that the uplink TCI state identifies the pathloss reference signal comprises means for identifying, in a downlink communication in which the indication of the uplink TCI state is included, a field configured to indicate whether the uplink TCI state identifies the pathloss reference signal; and means for determining that the uplink TCI state identifies the pathloss reference signal based at least in part on the field. In some aspects, the apparatus further comprises means for receiving an indication that the uplink TCI state identifies an updated pathloss reference signal that is different from the pathloss reference signal, wherein the indication that the uplink TCI state identifies the updated pathloss reference signal is received in a different downlink communication from a downlink communication in which the indication of the uplink TCI state is received.

In some aspects, the apparatus further comprises means for determining that that the uplink TCI state does not identifying the pathloss reference signal; and identify the pathloss reference signal based at least in part on at least one of a radio resource control communication, a medium access control element communication, or a downlink control information communication. In some aspects, the means for determining that the uplink TCI state identifies the pathloss reference signal, are to determine that the uplink TCI state identifies the pathloss reference signal based at least in part on the uplink transmission being scheduled.

In some aspects, an apparatus for wireless communication may include means for transmitting, to a UE, an indication of an uplink TCI state; and means for transmitting an associated pathloss reference signal based at least in part on the uplink TCI state.

In some aspects, the apparatus further comprises means for receiving an uplink transmission, that is based at least in part on the pathloss reference signal, in a physical uplink control channel resource, a physical uplink shared channel resource, a physical random access channel resource, or a sounding reference signal resource or resource set. In some aspects, the means for transmitting the indication of the uplink TCI state comprises means for transmitting the indication of the uplink TCI state in a radio resource control communication, a medium access control control element communication, or a downlink control information communication. In some aspects, the means for transmitting the indication of the uplink TCI state comprises means for transmitting the indication of the uplink TCI state in a downlink communication, wherein the downlink communication includes a field configured to indicate whether the uplink TCI state identifies the pathloss reference signal.

In some aspects, the means for transmitting the indication of the uplink TCI state comprises means for determining to update the pathloss reference signal for an associated uplink transmission; and means for transmitting the indication of the uplink TCI state based at least in part on the determination. In some aspects, the apparatus further comprises means for determining to update the pathloss reference signal for an associated uplink transmission; and means for transmitting, based at least in part on the determination, an indication of an updated pathloss reference signal in a different downlink communication from a downlink communication in which the indication of the uplink TCI state is transmitted.

In some aspects, the apparatus includes means for transmitting an indication of the pathloss reference signal in at least one of a radio resource control communication, a medium access control element communication, or a downlink control information communication, wherein the uplink TCI state does not identify the pathloss reference signal. In some aspects, the pathloss reference signal based at least in part on the uplink transmission.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
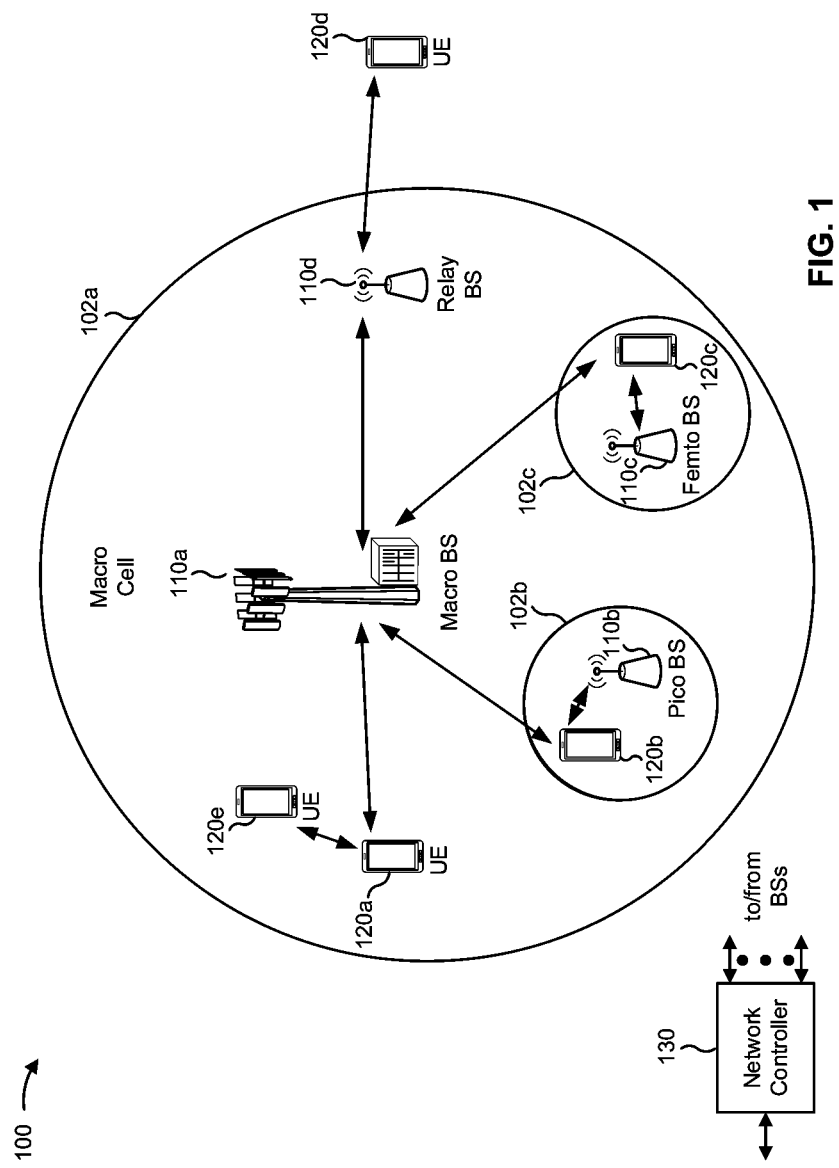
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
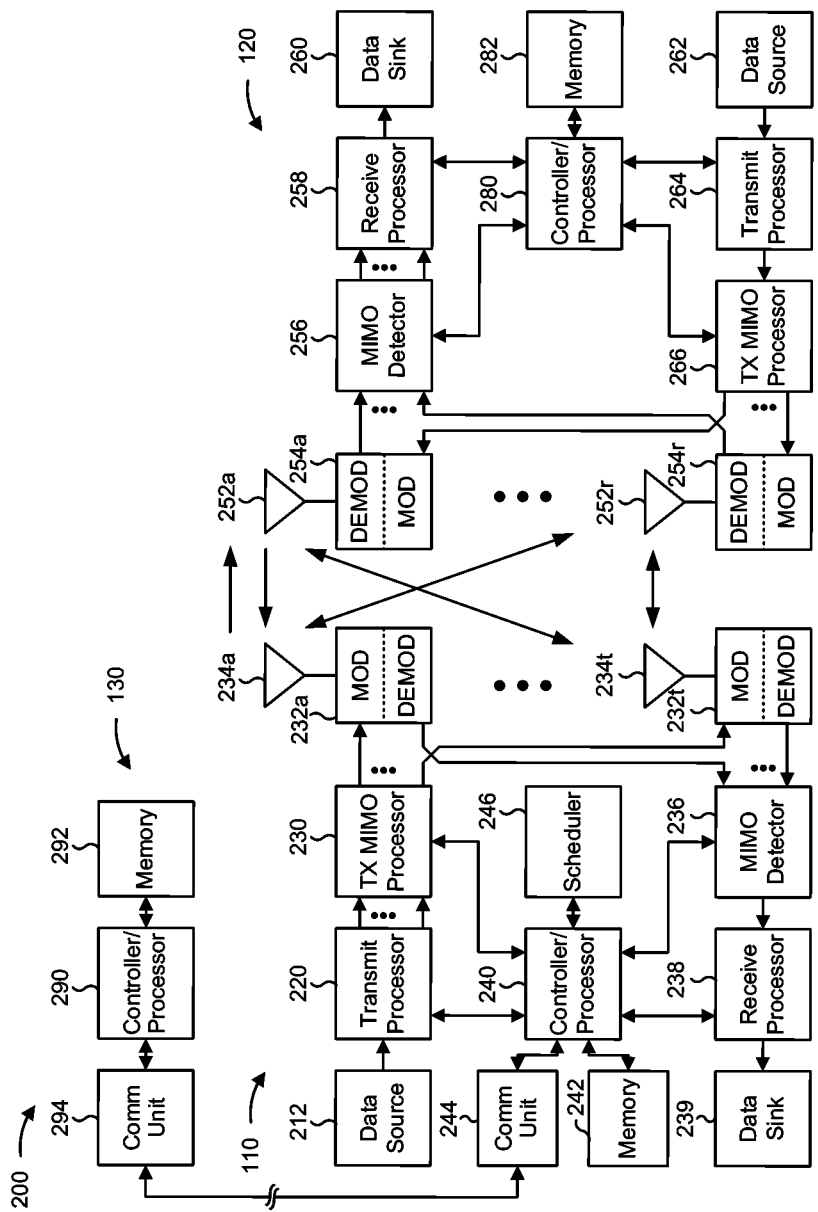
FIG. 2 is a diagram illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with activating a pathloss reference signal, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for receiving an indication of an uplink transmission configuration indication (TCI) state, means for determining that the uplink TCI state identifies a pathloss reference signal for an associated uplink transmission, means for determining an uplink power control parameter for the uplink transmission based at least in part on the pathloss reference signal, and/or the like.

In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE 120, an indication of an uplink TCI state, means for transmitting an associated pathloss reference signal based at least in part on the uplink TCI state, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Wireless communication devices, such as UEs, BSs, transmit-receive points (TRPs), and/or the like, may communicate with each other using beams. A beam may be defined using a transmission configuration indicator (TCI) state. A TCI state for a beam may indicate a source reference signal and a quasi-co-location (QCL) type to be used for the beam. The QCL type may correspond to one or more QCL relationships that indicate how the source reference signal is to be quasi-co-located (QCLed) with a channel on the beam. Two antenna ports are said to be QCLed if properties of the channel over which a symbol on one antenna port (e.g., the channel on the beam) is conveyed can be inferred from the channel over which a symbol on the other antenna port is conveyed (e.g., the source reference signal). Examples of QCL relationships that can be bundled in QCL types include Doppler shift, Doppler spread, average delay, delay spread, and a spatial receive parameter. Thus, properties of the beam can be derived from the properties of the source reference signal.

In some cases, a BS and/or a UE may be capable of downlink and/or uplink beam management. In such cases, the BS may be capable of configuring one or more beam management parameters, may be capable of activating and/or deactivating uplink and/or downlink beams, and/or the like for the UE. As an example, the BS may be capable of configuring, activating and/or deactivating uplink and/or downlink TCI states, such as physical downlink control channel (PDCCH) TCI states, physical downlink shared channel (PDSCH) TCI states, channel state information reference signal (CSI-RS) TCI states, and/or the like. As another example, the BS may be capable of configuring, activating, and/or deactivating uplink spatial relations (e.g., which may include indications of beam and/or BS co-location, quasi-co-location, and/or the like), such as physical uplink control channel (PUCCH) spatial relations, SRS spatial relations, and/or the like.

Moreover, the BS may be capable of configuring one or more pathloss reference signal parameters, capable of activating and/or deactivating pathloss reference signal transmission for the UE, and/or the like. In some aspects, the BS and/or the UE may use the pathloss reference signal to track, manage, and compensate for mobility of the BS and/or the UE in the wireless network. For example, the BS may configure pathloss reference signal parameters that indicate the time-frequency resources and/or the beams on which the BS is to transmit the pathloss reference signal, that configure periodic, semi-persistent, or aperiodic transmission the pathloss-reference signal, and/or the like.

When a beam or spatial relation for the UE changes, the BS may need to indicate beam management parameters and pathloss reference signal parameters to the UE in separate downlink communications, as there is no mechanism that permits the BS to indicate the pathloss reference signal parameters along with beam management signaling for the UE. This additional signaling causes additional overhead to configure the UE for beam and/or spatial relation changes, causes reduced reliability in beam management parameter and pathloss reference signal parameter signaling, causes latency in configure the pathloss reference signal parameters, and the UE, and/or the like.

Some techniques and apparatuses described herein provide a unified framework for beam management. In some aspects, an uplink TCI state is introduced to provide flexibility in dynamically configuring and/or updating pathloss reference signal parameters to be used as part of beam management. In this way, the BS may use the uplink TCI state to indicate various types of uplink QCL relationships to the UE, such as Doppler shift, Doppler spread, average delay, delay spread, and/or the like. Moreover, the uplink TCI state permits beam management parameters and pathloss reference signal parameters to be indicated in the same downlink communication, which reduces overhead in configuring the UE for beam and/or spatial relation changes, increases reliability in beam management parameter and pathloss reference signal parameter signaling, decreases latency in configure the pathloss reference signal parameters, and the UE, and/or the like.

Moreover, the BS may flexibly use the uplink TCI state to indicate whether a pathloss reference signal is configured for an associated uplink transmission, may use the uplink TCI state to indicate various parameters for the pathloss reference signal, and/or the like. In this way, the UE may determine that an indication of an uplink TCI state identifies a pathloss reference signal that is to be measured for determining an uplink power control parameter that is to be used for the associated uplink transmission.

Figure 3A:
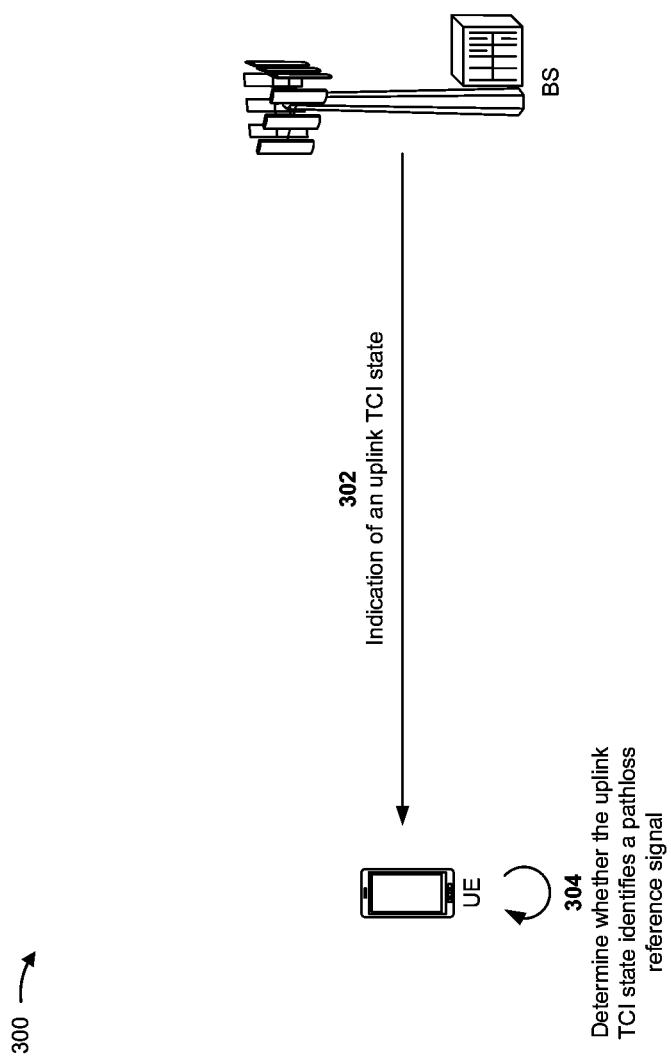
FIGS. 3A and 3B are diagrams illustrating one or more examples of activating a pathloss reference signal, in accordance with various aspects of the present disclosure.
Figure 3B:
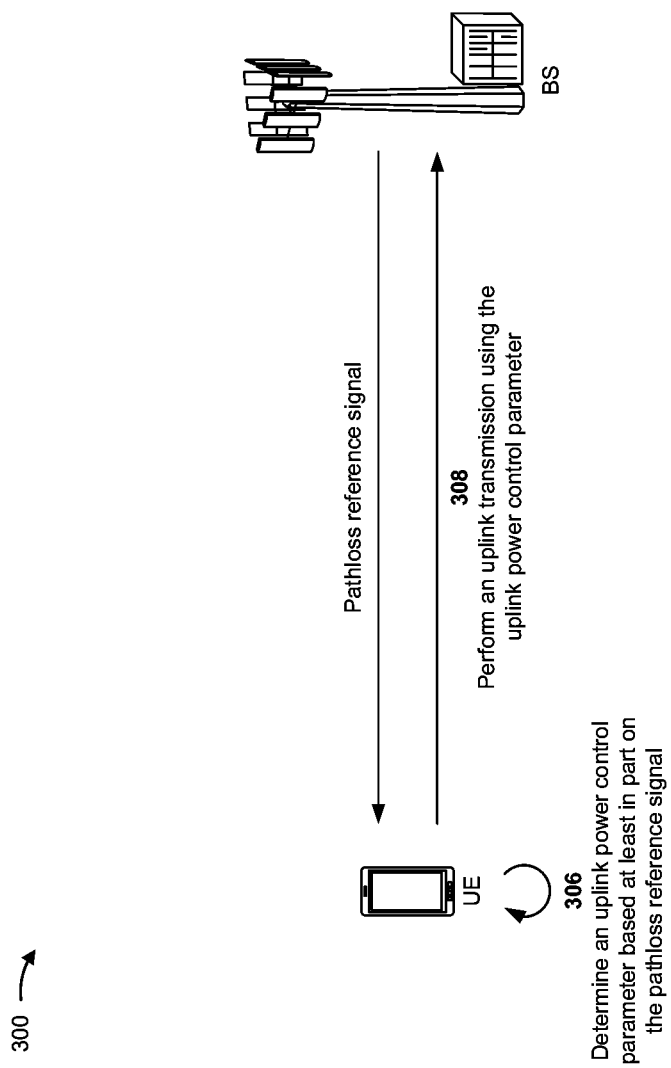

FIGS. 3A and 3B are diagrams illustrating one or more examples 300 of activating a pathloss reference signal, in accordance with various aspects of the present disclosure. As shown in FIG. 3, example(s) 300 may include communication between a UE (e.g., UE 120) and a BS (e.g., BS 110). In some aspects, the BS and the UE may be included in a wireless network such as wireless network 100. In some aspects, the BS and the UE may communicate on an access link, which may include an uplink and a downlink.

In some aspects, the BS and the UE may be capable of multi-beam operation on the uplink and/or the downlink. For example, the BS and the UE may be capable of communicating on the downlink using one or more downlink beams, may be capable of communicating on the uplink using one or more uplink beams, and/or the like. In some aspects, the BS and/or the UE may be capable of downlink and/or uplink beam management. In this case, the BS may be capable of configuring one or more beam management parameters, may be capable of activating and/or deactivating uplink and/or downlink beams, and/or the like. Moreover, the BS may be capable of configuring one or more pathloss reference signal parameters, capable of activating and/or deactivating pathloss reference signal transmission for the UE, and/or the like. In some aspects, the BS and/or the UE may use the pathloss reference signal to track, manage, and compensate for mobility of the BS and/or the UE in the wireless network.

As shown in FIG. 3A, and by reference number 302, the BS may transmit an indication of an uplink TCI state to indicate various types of uplink QCL relationships to the UE, such as Doppler shift, Doppler spread, average delay, delay spread, and/or the like. In some aspects, the BS may transmit the indication of the uplink TCI state based at least in part on a beam change or spatial relation change for the UE. In some aspects, the uplink TCI state may be associated with an uplink transmission scheduled for the UE, such as a PUCCH transmission, a physical uplink shared channel (PUSCH) transmission, a physical random access channel (PRACH) transmission, a sounding reference signal (SRS) transmission, or another type of uplink transmission. For example, the BS may transmit the indication of the uplink TCI state in a scheduling downlink control information (DCI) communication that schedules the resources (e.g., a PUCCH resource, a PUSCH resource, an SRS resource indicator (SRI) for a PUSCH transmission, a PRACH resource, an SRS resource or resource set, and/or the like) for the uplink transmission.

In some aspects, the BS may transmit the indication of the uplink TCI state in a downlink communication (e.g., a downlink signaling communication), such as a radio resource control (RRC) communication, a medium access control element (MAC-CE) communication, a DCI communication, and/or the like. In some aspects, the uplink TCI state may be indicated in an uplink TCI field in the downlink communication. In some aspects, the BS may transmit the indication of the uplink TCI state in the same downlink communication as other beam management information and/or parameters, such as uplink and/or downlink beam activation information, downlink TCI state information, and/or the like.

As further shown in FIG. 3A, and by reference number 304, the UE may receive the indication of the uplink TCI state, and may determine whether the uplink TCI state identifies a pathloss reference signal for the associated uplink transmission. In some aspects, the BS may configure the uplink TCI state (or the uplink TCI field) to always indicate an associated pathloss reference signal and/or parameters for the pathloss reference signal. In some aspects, the BS may configure the UE to always determine that the uplink TCI state identifies a pathloss reference signal via downlink signaling (e.g., via an RRC communication, a MAC-CE communication, a DCI communication, and/or the like). In this case, the UE may determine that the uplink TCI state identifies a pathloss reference signal for the associated uplink transmission.

In some aspects, the BS may configure the uplink TCI state (or uplink TCI field) to identify a pathloss reference signal in some cases, and to not identify a pathloss reference signal in other cases. Whether the uplink TCI state (or uplink TCI field) identifies a pathloss reference signal may be indicated in additional signaling in the downlink communication including the indication of the uplink TCI state. For example, the downlink communication may include another field (e.g., a pathloss reference signal indicator field) that includes a flag, a bit, a value, and/or the like. The flag, bit, value, and/or the like in the field may be used to indicate whether the uplink TCI state indicated in the uplink TCI field of the downlink communication identifies a pathloss reference signal. As an example, a first value in the field may indicate that the uplink TCI state identifies a pathloss reference signal, whereas a second value in the field may indicate that the uplink TCI state does not identify a pathloss reference signal.

As shown in FIG. 3B, and by reference number 306, if the UE determines that the uplink TCI state identifies a pathloss reference signal associated with the uplink transmission, the UE may determine an uplink power control parameter for the uplink transmission based at least in part on the pathloss reference signal (e.g., which may be transmitted from the BS). The pathloss reference signal may include a demodulation reference signal (DMRS), a CSI-RS, a tracking reference signal (TRS), a reference signal that is specifically configured to be a pathloss reference signal, or another type of reference signal. The UE may determine the uplink power control parameter by performing one or more measurements of the pathloss reference signal, which may include a pathloss measurement, an RSRP measurement, an RSSI measurement, an RSRQ measurement, a CQI measurement, a signal to noise ratio (SNR) measurement, a signal to interference plus noise ratio (SINR) measurement, and/or the like. The uplink power control parameter may include an automatic gain control parameter, an open loop power control parameter, a closed loop power control parameter, a transmit power, and/or the like.

As further shown in FIG. 3B, and by reference number 308, the UE may perform the uplink transmission using the uplink power control parameter. For example, the UE may configure the uplink transmission power for the uplink transmission based at least in part on the uplink power control parameter, and may perform the uplink transmission at the configured uplink transmission power.

In some aspects, the BS may update the pathloss reference signal for the UE. For example, if the BS previously transmitted an indication of the uplink TCI state to the UE for a different type of uplink transmission or a different beam (e.g., which may be associated with a different pathloss reference signal or a different pathloss reference signal configuration), the BS may transmit the indication of the uplink TCI state to update the pathloss reference signal for the different type of uplink transmission. As another example, the BS may transmit an indication of an updated pathloss reference signal for an uplink TCI state indicated in a previous downlink communication. In this case, the BS may transmit the indication of the updated pathloss reference signal in a different downlink communication, which may include an RRC communication, a MAC-CE communication, a DCI communication, and/or the like.

In this way, the BS may use an uplink TCI state to provide flexibility in dynamically configuring and/or updating pathloss reference signal parameters to be used as part of beam management. The BS may use the uplink TCI state to indicate various types of uplink QCL relationships to the UE, such as Doppler shift, Doppler spread, average delay, delay spread, and/or the like. Moreover, the uplink TCI state permits beam management parameters and pathloss reference signal parameters to be indicated in the same downlink communication, which reduces overhead in configuring the UE for beam and/or spatial relation changes, increases reliability in beam management parameter and pathloss reference signal parameter signaling, decreases latency in configure the pathloss reference signal parameters, and the UE, and/or the like. In this way, the BS may flexibly use the uplink TCI state to indicate whether a pathloss reference signal is configured for an associated uplink transmission, may use the uplink TCI state to indicate various parameters for the pathloss reference signal, and/or the like. The UE may determine that an indication of an uplink TCI state identifies a pathloss reference signal that is to be measured for determining an uplink power control parameter that is to be used for the associated uplink transmission.

As indicated above, FIGS. 3A and 3B are provided as one or more examples. Other examples may differ from what is described with respect to FIGS. 3A and 3B.

Figure 4:
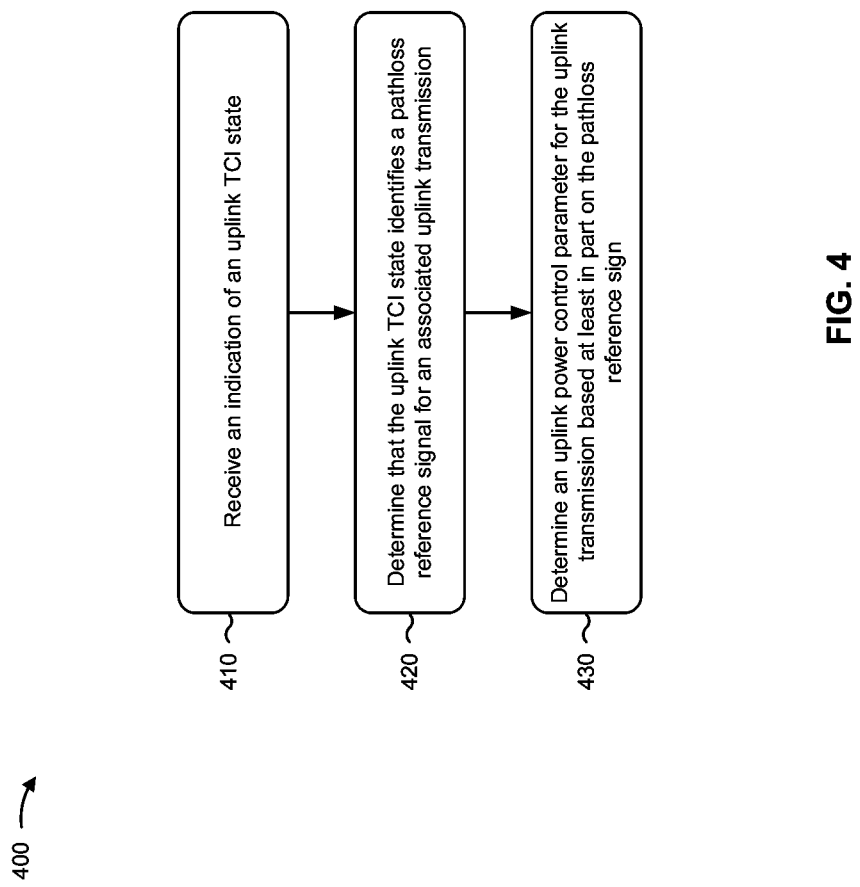
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120, apparatus 602 depicted in FIG. 6, and/or the like) performs operations associated with activating a pathloss reference signal.

As shown in FIG. 4, in some aspects, process 400 may include receiving an indication of an uplink TCI state (block 410). For example, the UE (e.g., using receive processor 258, transmit processor 264, controller/processor 280, memory 282, and/or the like) may receive an indication of an uplink TCI state, as described above.

As further shown in FIG. 4, in some aspects, process 400 may include determining that the uplink TCI state identifies a pathloss reference signal for an associated uplink transmission (block 420). For example, the UE (e.g., using receive processor 258, transmit processor 264, controller/processor 280, memory 282, and/or the like) may determine that the uplink TCI state identifies a pathloss reference signal for an associated uplink transmission, as described above.

As further shown in FIG. 4, in some aspects, process 400 may include determining an uplink power control parameter for the uplink transmission based at least in part on the pathloss reference signal (block 430). For example, the UE (e.g., using receive processor 258, transmit processor 264, controller/processor 280, memory 282, and/or the like) may determine an uplink power control parameter for the uplink transmission based at least in part on the pathloss reference signal, as described above.

Process 400 may include additional aspects, such as any single aspect or any combination of aspects described below and/or in connection with one or more other processes described elsewhere herein.

In a first aspect, process 400 includes performing the uplink transmission using the uplink power control parameter. In a second aspect, alone or in combination with the first aspect, process 400 includes performing the uplink transmission in a physical uplink control channel resource, a physical uplink shared channel resource, a physical random access channel resource, or a sounding reference signal resource or resource set. In a third aspect, alone or in combination with one or more of the first and second aspects, receiving the indication of the uplink TCI state comprises receiving the indication of the uplink TCI state in a radio resource control communication, a medium access control element communication, or a downlink control information communication.

In a fourth aspect, alone or in combination with one or more of the first through third aspects, determining that the uplink TCI state identifies the pathloss reference signal comprises identifying, in a downlink communication in which the indication of the uplink TCI state is included, a field configured to indicate whether the uplink TCI state identifies the pathloss reference signal and determining that the uplink TCI state identifies the pathloss reference signal based at least in part on the field. In a fifth aspect, alone or in combination with one or more of the first through fourth aspects, process 400 includes receiving an indication that the uplink TCI state identifies an updated pathloss reference signal that is different from the pathloss reference signal, wherein the indication that the uplink TCI state identifies the updated pathloss reference signal is received in a different downlink communication from a downlink communication in which the indication of the uplink TCI state is received.

In a sixth aspect, alone or in combination with one or more of the first through fifth aspects, process 400 includes determining that that the uplink TCI state does not identify the pathloss reference signal; and identifying the pathloss reference signal based at least in part on at least one of a radio resource control communication, a medium access control element communication, or a downlink control information communication. In a seventh aspect, alone or in combination with one or more of the first through sixth aspects, determining that the uplink TCI state identifies the pathloss reference signal comprises determining that the uplink TCI state identifies the pathloss reference signal based at least in part on the uplink transmission being scheduled.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
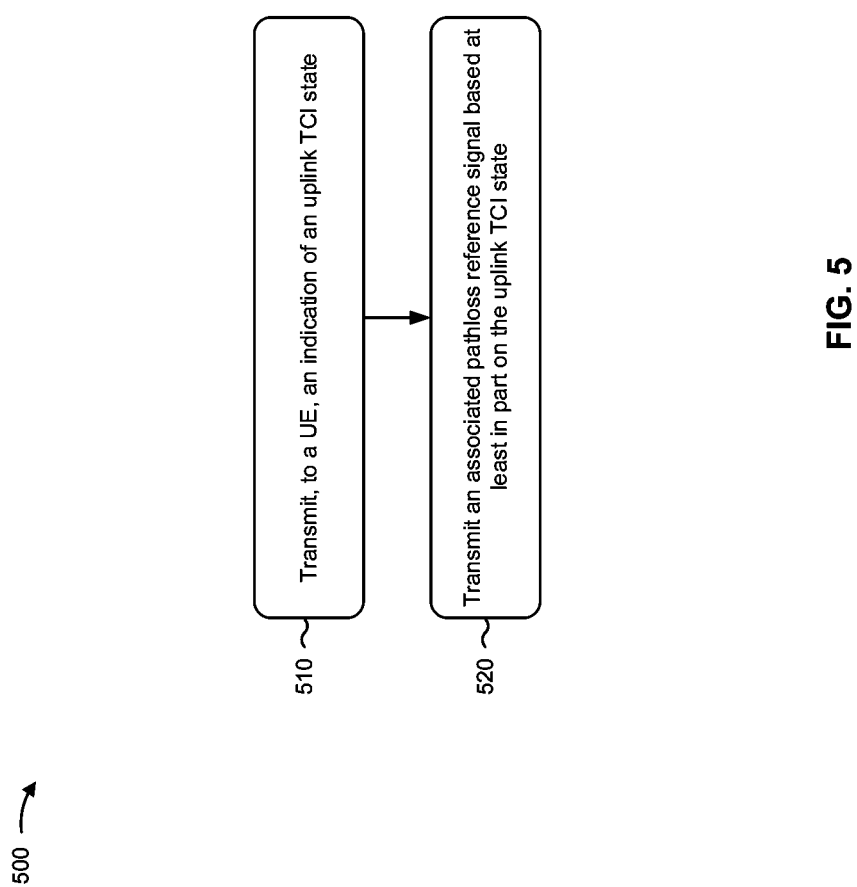
FIG. 5 is a diagram illustrating an example process performed, for example, by a BS, in accordance with various aspects of the present disclosure.

FIG. 5 is a diagram illustrating an example process 500 performed, for example, by a BS, in accordance with various aspects of the present disclosure. Example process 500 is an example where the BS (e.g., BS 110, apparatus 702 depicted in FIG. 7, and/or the like) performs operations associated with activating a pathloss reference signal.

As shown in FIG. 5, in some aspects, process 500 may include transmitting, to a UE, an indication of an uplink TCI state (block 510). For example, the BS (e.g., using transmit processor 220, receive processor 238, controller/processor 240, memory 242, and/or the like) may transmit, to a UE, an indication of an uplink TCI state, as described above.

As further shown in FIG. 5, in some aspects, process 500 may include transmitting an associated pathloss reference signal based at least in part on the uplink TCI state (block 520). For example, the BS (e.g., using transmit processor 220, receive processor 238, controller/processor 240, memory 242, and/or the like) may transmit an associated pathloss reference signal based at least in part on the uplink TCI state, as described above.

Process 500 may include additional aspects, such as any single aspect or any combination of aspects described below and/or in connection with one or more other processes described elsewhere herein.

In a first aspect, process 500 includes receiving an uplink transmission, that is based at least in part on the pathloss reference signal, in a physical uplink control channel resource, a physical uplink shared channel resource, a physical random access channel resource, or a sounding reference signal resource or resource set. In a second aspect, alone or in combination with the first aspect, transmitting the indication of the uplink TCI state comprises transmitting the indication of the uplink TCI state in a radio resource control communication, a medium access control control element communication, or a downlink control information communication. In a third aspect, alone or in combination with one or more of the first and second aspects, transmitting the indication of the uplink TCI state comprises transmitting the indication of the uplink TCI state in a downlink communication, wherein the downlink communication includes a field configured to indicate whether the uplink TCI state identifies the pathloss reference signal.

In a fourth aspect, alone or in combination with one or more of the first through third aspects, transmitting the indication of the uplink TCI state comprises determining to update the pathloss reference signal for an associated uplink transmission, and transmitting the indication of the uplink TCI state based at least in part on the determination. In a fifth aspect, alone or in combination with one or more of the first through fourth aspects, process 500 includes determining to update the pathloss reference signal for an associated uplink transmission, and transmitting, based at least in part on the determination, an indication of an updated pathloss reference signal in a different downlink communication from a downlink communication in which the indication of the uplink TCI state is transmitted.

In a sixth aspect, alone or in combination with one or more of the first thought fifth aspects, process 500 includes transmitting an indication of the pathloss reference signal in at least one of a radio resource control communication, a medium access control element communication, or a downlink control information communication, wherein the uplink TCI state does not identify the pathloss reference signal. In a seventh aspect, alone or in combination with one or more of the first thought sixth aspects, the pathloss reference signal based at least in part on the uplink transmission.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
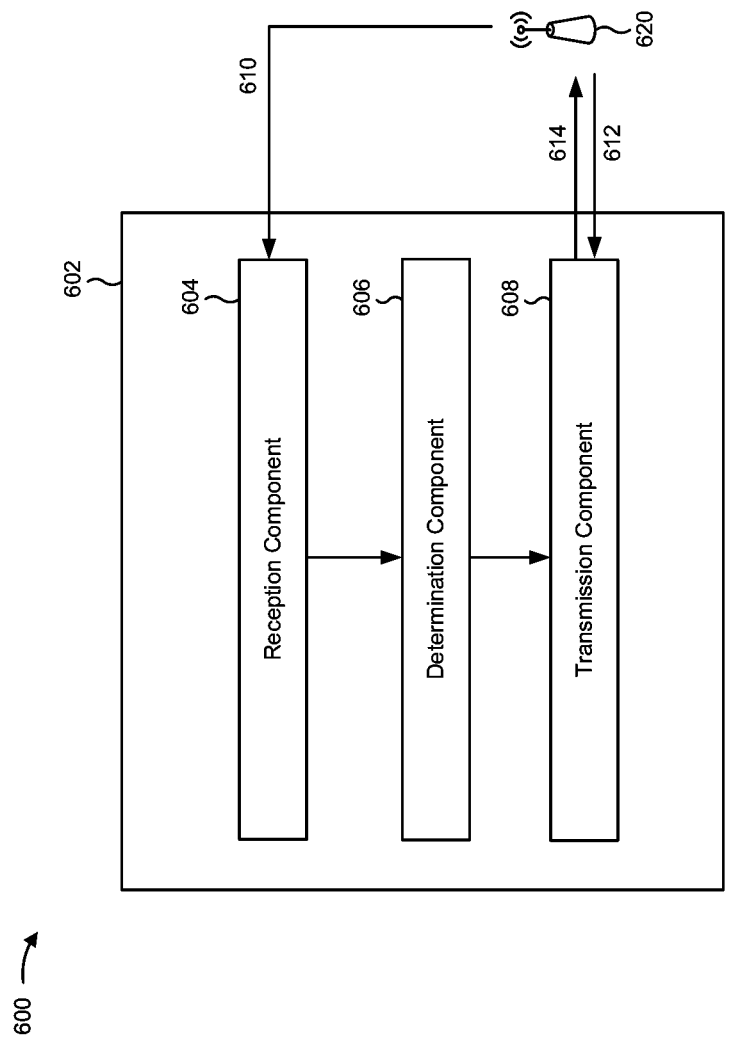
FIG. 6 is a data flow diagram illustrating data flow between different modules/means/components in an example apparatus, in accordance with various aspects of the present disclosure.

FIG. 6 is a data flow diagram 600 illustrating data flow between different modules/means/components in an example apparatus 602. The apparatus 602 may be a UE (e.g., UE 120). In some aspects, the apparatus 602 includes a reception component 604, a determination component 606, and a transmission component 608.

In some aspects, reception component 604 may receive, from a BS 620 (e.g., BS 110), an indication 610 of an uplink TCI state. In some aspects, determination component 606 may determine that the uplink TCI state identifies a pathloss reference signal 612 for an associated uplink transmission 614. In some aspects, determination component 606 may determine an uplink power control parameter for the uplink transmission 614 based at least in part on the pathloss reference signal 612 and based at least in part on the determination of determination component 606. In some aspects, transmission component 608 may perform the uplink transmission 614 using the uplink power control parameter determined by determination component 606.

In some aspects, reception component 604 may include an antenna (e.g., antenna 252), a DEMOD (e.g., DEMOD 254), a MIMO detector (e.g., MIMO detector 256), a receive processor (e.g., receive processor 258), a controller/processor (e.g., controller/processor 280), a memory (e.g., memory 282), and/or the like. In some aspects, determination component 606 may include a receive processor (e.g., receive processor 258), a transmit processor 264, a controller/processor (e.g., controller/processor 280), a memory (e.g., memory 282), and/or the like. In some aspects, transmission component 608 may include an antenna (e.g., antenna 252), a MOD (e.g., MOD 254), a Tx MIMO processor (e.g., TX MIMO processor 266), a transmit processor (e.g., transmit processor 264), a controller/processor (e.g., controller/processor 280), a memory (e.g., memory 282), and/or the like.

The apparatus 602 may include additional components that perform each of the blocks of the algorithm in the aforementioned process 400 of FIG. 400, process 500 of FIG. 500, and/or the like. Each block in the aforementioned process 400 of FIG. 4, process 500 of FIG. 5, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

Figure 7:
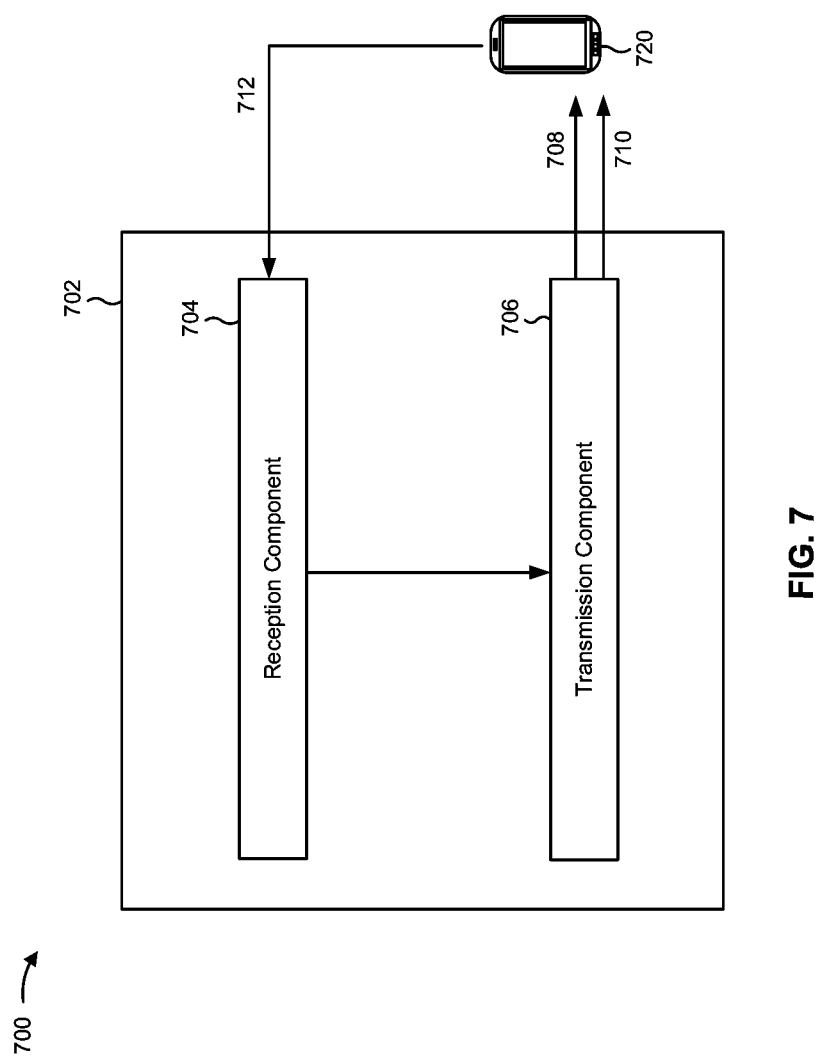
FIG. 7 is a data flow diagram illustrating data flow between different modules/means/components in an example apparatus, in accordance with various aspects of the present disclosure.

FIG. 7 is a data flow diagram 700 illustrating data flow between different modules/means/components in an example apparatus 702. The apparatus 702 may be a BS (e.g., BS 110). In some aspects, the apparatus 702 includes a reception component 704 and a transmission component 706.

In some aspects, transmission component 706 may transmit, to UE 720 (e.g., UE 120), an indication 708 of an uplink TCI state. In some aspects, transmission component 706 may transmit an associated pathloss reference signal 710 based at least in part on the uplink TCI state. In some aspects, reception component 704 may receive an uplink transmission 712 from the UE 720 based at least in part on an uplink power control parameter that was determined based at least in part on the pathloss reference signal 710.

In some aspects, reception component 704 may include an antenna (e.g., antenna 234), a DEMOD (e.g., DEMOD 232), a MIMO detector (e.g., MIMO detector 236), a receive processor (e.g., receive processor 238), a controller/processor (e.g., controller/processor 240), a memory (e.g., memory 242), and/or the like. In some aspects, transmission component 706 may include an antenna (e.g., antenna 234), a MOD (e.g., MOD 232), a Tx MIMO processor (e.g., TX MIMO processor 230), a transmit processor (transmit processor 220), a controller/processor (e.g., controller/processor 240), a memory (e.g., memory 242), and/or the like.

The apparatus 702 may include additional components that perform each of the blocks of the algorithm in the aforementioned process 400 of FIG. 400, process 500 of FIG. 500, and/or the like. Each block in the aforementioned process 400 of FIG. 4, process 500 of FIG. 5, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of components (e.g., one or more components) shown in FIG. 7 may perform one or more functions described as being performed by another set of components shown in FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving an indication of an uplink transmission configuration indication (TCI) state in a downlink control information communication,
      wherein the indication of the uplink TCI state includes an indication of one or more types of uplink quasi-co-location (QCL) relationships;
   identifying that the uplink TCI state includes an indication of a pathloss reference signal for an associated uplink transmission; and
   identifying an uplink power control parameter for the associated uplink transmission based at least in part on the pathloss reference signal.

2. The method of claim 1, further comprising:
   performing the associated uplink transmission using the uplink power control parameter.

3. The method of claim 1, further comprising:
   performing the associated uplink transmission in:
      a physical uplink control channel resource,
      a physical uplink shared channel resource,
      a physical random access channel resource, or
      a sounding reference signal resource or resource set.

4. The method of claim 1, further comprising:
   receiving an indication of another uplink TCI state;
   determining that the other uplink TCI state does not identify another pathloss reference signal; and
   identifying the other pathloss reference signal based at least in part on at least one of:
      a radio resource control communication,
      a medium access control element communication, or
      another downlink control information communication.

5. The method of claim 1, wherein identifying that the uplink TCI state includes the indication of the pathloss reference signal comprises:
   identifying, in the downlink control information communication, a field configured to indicate whether the uplink TCI state identifies the pathloss reference signal; and
   identifying that the uplink TCI state includes the indication of the pathloss reference signal based at least in part on the field.

6. The method of claim 1, wherein identifying that the uplink TCI state includes the indication of the pathloss reference signal comprises:
   identifying that the uplink TCI state includes the indication of the pathloss reference signal based at least in part on the associated uplink transmission being scheduled.

7. The method of claim 1, further comprising:
   receiving an indication that the uplink TCI state identifies an updated pathloss reference signal that is different from the pathloss reference signal,
      wherein the indication that the uplink TCI state identifies the updated pathloss reference signal is received in a different downlink communication from the downlink control information communication.

8. A method of wireless communication performed by a network entity, comprising:
   transmitting an indication of an uplink transmission configuration indication (TCI) state in a downlink control information communication,
      wherein the indication of the uplink TCI state includes an indication of one or more types of uplink quasi-co-location (QCL) relationships; and
   transmitting an associated pathloss reference signal based at least in part on the uplink TCI state,
      wherein the uplink TCI state includes an indication of the associated pathloss reference signal.

9. The method of claim 8, further comprising:
   receiving an uplink transmission, that is based at least in part on the associated pathloss reference signal, in:
      a physical uplink control channel resource,
      a physical uplink shared channel resource, a physical random access channel resource, or
a sounding reference signal resource or resource set.

10. The method of claim 8, further comprising:
transmitting the indication of the associated pathloss reference signal in at least one of:
a radio resource control communication,
a medium access control element communication, or
another downlink control information communication.

11. The method of claim 8, wherein the associated pathloss reference signal is updated based at least in part on an associated uplink transmission.

12. The method of claim 8,
wherein the downlink control information communication includes a field configured to indicate whether the uplink TCI state identifies the associated pathloss reference signal.

13. The method of claim 8, wherein transmitting the indication of the uplink TCI state comprises:
determining to update a pathloss reference signal for an associated uplink transmission; and
transmitting the indication of the uplink TCI state based at least in part on the determination.

14. The method of claim 8, further comprising:
determining to update the associated pathloss reference signal for an associated uplink transmission; and
transmitting, based at least in part on the determination, an indication of an updated pathloss reference signal in a different downlink communication from the downlink control information communication.

15. A user equipment (UE) for wireless communication, comprising:
a memory; and
one or more processors coupled to the memory, the one or more processors configured to:
receive an indication of an uplink transmission configuration indication (TCI) state in a downlink control information communication,
wherein the indication of the uplink TCI state includes an indication of one or more types of uplink quasi-co-location (QCL) relationships;
identify that the uplink TCI state includes an indication of a pathloss reference signal for an associated uplink transmission; and
identify an uplink power control parameter for the associated uplink transmission based at least in part on the pathloss reference signal.

16. The UE of claim 15, wherein the one or more processors are further configured to:
perform the associated uplink transmission using the uplink power control parameter.

17. The UE of claim 15, wherein the one or more processors are further configured to:
perform the associated uplink transmission in:
a physical uplink control channel resource,
a physical uplink shared channel resource,
a physical random access channel resource, or
a sounding reference signal resource or resource set.

18. The UE of claim 15, wherein the one or more processors, when identifying that the uplink TCI state includes the indication of the pathloss reference signal, are configured to:
identify, in the downlink control information communication, a field configured to indicate whether the uplink TCI state identifies the pathloss reference signal; and
identify that the uplink TCI state includes the indication of the pathloss reference signal based at least in part on the field.

19. The UE of claim 15, wherein the one or more processors are further configured to:
receive an indication that the uplink TCI state identifies an updated pathloss reference signal that is different from the pathloss reference signal,
wherein the indication that the uplink TCI state identifies the updated pathloss reference signal is received in a different downlink communication from the downlink control information communication.

20. The UE of claim 15, wherein the one or more processors are further configured to:
receive an indication of another uplink TCI state;
determine that the other uplink TCI state does not identify another pathloss reference signal; and
identify the other pathloss reference signal based at least in part on at least one of:
a radio resource control communication,
a medium access control element communication, or
another downlink control information communication.

21. The UE of claim 15, wherein the one or more processors, when identifying that the uplink TCI state includes the indication of the pathloss reference signal, are configured to:
identify that the uplink TCI state includes the indication of the pathloss reference signal based at least in part on the associated uplink transmission being scheduled.

22. A network entity for wireless communication, comprising:
a memory; and
one or more processors coupled to the memory, the one or more processors configured to:
transmit an indication of an uplink transmission configuration indication (TCI) state in a downlink control information communication,
wherein the indication of the uplink TCI state includes an indication of one or more types of uplink quasi-co-location (QCL) relationships; and
transmit an associated pathloss reference signal based at least in part on the uplink TCI state,
wherein the uplink TCI state includes an indication of the associated pathloss reference signal.

23. The network entity of claim 22, wherein the one or more processors are further configured to:
receive an uplink transmission, that is based at least in part on the associated pathloss reference signal, in:
a physical uplink control channel resource,
a physical uplink shared channel resource,
a physical random access channel resource, or
a sounding reference signal resource or resource set.

24. The network entity of claim 22,
wherein the downlink control information communication includes a field configured to indicate whether the uplink TCI state identifies the associated pathloss reference signal.

25. The network entity of claim 22, wherein the one or more processors, when transmitting the indication of the uplink TCI state, are configured to:
determine to update a pathloss reference signal for an associated uplink transmission; and
transmit the indication of the uplink TCI state based at least in part on the determination.

26. The network entity of claim 22, wherein the one or more processors are further configured to:
determine to update the associated pathloss reference signal for an associated uplink transmission; and transmit, based at least in part on the determination, an indication of an updated pathloss reference signal in a different downlink communication from the downlink control information communication.

27. The network entity of claim 22, wherein the one or more processors are further configured to:
transmit the indication of the associated pathloss reference signal in at least one of:
a radio resource control communication,
a medium access control element communication, or
another downlink control information communication.

28. The network entity of claim 22, wherein the associated pathloss reference signal is updated based at least in part on an associated uplink transmission.

* * * * *